United States Patent
Favero et al.

(10) Patent No.: US 11,046,601 B2
(45) Date of Patent: Jun. 29, 2021

(54) METHOD FOR TREATING PRODUCTION WATER FROM A METHOD FOR ENHANCED OIL AND/OR GAS RECOVERY

(71) Applicant: S.P.C.M SA, Andrezieux Boutheon (FR)

(72) Inventors: Cédrick Favero, Andrezieux Boutheon (FR); Ludwig Gil, Andrezieux Boutheon (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 381 days.

(21) Appl. No.: 16/316,815

(22) PCT Filed: Jul. 27, 2017

(86) PCT No.: PCT/FR2017/052117
§ 371 (c)(1),
(2) Date: Jan. 10, 2019

(87) PCT Pub. No.: WO2018/020175
PCT Pub. Date: Feb. 1, 2018

(65) Prior Publication Data
US 2019/0292079 A1    Sep. 26, 2019

(30) Foreign Application Priority Data
Jul. 28, 2016 (FR) ...................... 1657327

(51) Int. Cl.
*C02F 1/24* (2006.01)
*C02F 1/72* (2006.01)
(Continued)

(52) U.S. Cl.
CPC ............... *C02F 1/725* (2013.01); *C02F 1/24* (2013.01); *C02F 1/727* (2013.01); *C09K 8/588* (2013.01);
(Continued)

(58) Field of Classification Search
CPC .. C02F 1/24; C02F 1/725; C02F 1/727; C02F 2101/32; C02F 2103/10; C02F 2103/365;
(Continued)

(56) References Cited

U.S. PATENT DOCUMENTS

| 3,343,601 A | 9/1967 | Pye |
| 2013/0213650 A1 | 8/2013 | Argillier et al. |
| 2014/0072653 A1 | 3/2014 | Buschmann |

FOREIGN PATENT DOCUMENTS

| EP | 2450314 A1 | 5/2012 |
| FR | 3012129 A1 | 4/2015 |

OTHER PUBLICATIONS

International Search Report (and English translation) and Written Opinion of the International Searching Authority for PCT/FR2017/052117 dated Sep. 21, 2017.

(Continued)

*Primary Examiner* — Lucas A Stelling
(74) *Attorney, Agent, or Firm* — Heslin Rothenberg Farley & Mesiti P.C.

(57) ABSTRACT

The present invention concerns a method for treating the production water originating from enhanced hydrocarbon recovery, and containing one or more water-soluble polymers and $Fe^{2+}$ ions, consisting of at least partially oxidizing the $Fe^{2+}$ ions by introducing at least one reaction activator and oxygen into said production water, the molar ratio of introduced oxygen to $Fe^{2+}$ ions being less than or equal to 0.25.

20 Claims, 1 Drawing Sheet

(51) Int. Cl.
*C09K 8/588* (2006.01)
*C02F 101/32* (2006.01)
*C02F 103/10* (2006.01)
*C02F 103/36* (2006.01)

(52) U.S. Cl.
CPC ...... *C02F 2101/32* (2013.01); *C02F 2103/10* (2013.01); *C02F 2103/365* (2013.01); *C02F 2209/09* (2013.01); *C02F 2209/22* (2013.01); *C02F 2303/08* (2013.01); *C02F 2303/18* (2013.01); *C02F 2305/023* (2013.01)

(58) Field of Classification Search
CPC .............. C02F 2209/09; C02F 2209/22; C02F 2303/08; C02F 2303/18; C02F 2305/023; C09K 8/588
See application file for complete search history.

(56) References Cited

OTHER PUBLICATIONS

Audibert, A., et al., "Stability of water-soluble polymers in the presence of corrodible materials", Polymer Degradation, vol. 40, pp. 151-165 (1993).
Thomas, S., "Enhanced Oil Recovery—An Overview", Oil & Gas Science and Technology, vol. 63, No. 1, pp. 9-19 (2008).

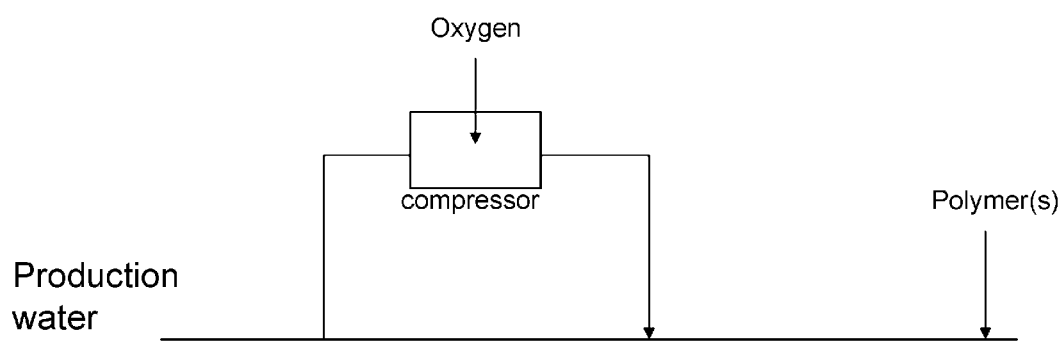

METHOD FOR TREATING PRODUCTION WATER FROM A METHOD FOR ENHANCED OIL AND/OR GAS RECOVERY

CROSS REFERENCE TO RELATED APPLICATIONS

This application is a national stage filing under section 371 of International Application No. PCT/FR2017/052117, filed on Jul. 27, 2017, and published on Feb. 1, 2018 as WO 2018/020175, which claims priority to French Application No. 1657327, filed on Jul. 28, 2016. The entire contents of WO 2018/020175 are hereby incorporated herein by reference.

FIELD OF THE INVENTION

The present invention relates to the technical field of enhanced hydrocarbon (oil and/or gas) recovery in a deposit. More specifically, the present invention relates to the technical field of the treatment of the production water derived from the enhanced recovery of hydrocarbons (oil and/or gas).

DESCRIPTION OF THE PRIOR ART

Water treatment in the oil industry is a subject of the utmost importance, since it is estimated that for each barrel of petroleum (oil) produced in the world, three barrels of water are generally co-produced. This co-production of water may reach 9 to 99 barrels of water per barrel of oil in mature fields, which are often affected by chemically-enhanced oil recovery.

The crude oil contained in deposits is generally recovered in several stages.

The production results first from the natural energy of the fluids and rock that decompress. After this depletion phase, the quantity of oil recovered at the surface represents on average 5 to 15% of the initial reserve. It is therefore necessary, in a second stage, to employ techniques targeting increased recovery yields while maintaining the pressure in the field.

The most frequent method consists of injecting water, and more generally brine, into the deposit through injection wells dedicated to this purpose. This is called secondary recovery. This second phase stops when the quantity of water in the mixture produced by producing well is too high. The gain here in terms of additional oil recovery rate is about 5 to 20%.

The other techniques that can be used are together called enhanced oil recovery (EOR). Their goal is to recover between 10 and 35% of additional oil relative to the initial quantity. Diverse treatments with or without heat are known under the term enhanced oil recovery, such as electric, miscible, vapor, or chemical techniques for improved recovery of remaining oil (See "Oil & Gas Science and Technology"—IFP review, vol 63 (2008) No. 1, pp 9-19). "Oil" means any type of oil, i.e. both light and heavy oil, or even bitumen. This is a mixture of hydrocarbons. The terms petroleum and oil are equivalent and both refer to this mixture of hydrocarbons.

The invention more specifically relates to the technique for chemically-enhanced hydrocarbon (oil and/or gas) recovery involving at least the injection into the deposit of an aqueous fluid containing one or more water-soluble polymers.

A distinction is made between enhanced oil recovery (EOR) techniques and reservoir stimulation operations. The latter are characterized by injections of limited volumes of polymer solution in order to create a localized phenomenon in the reservoir, namely for the conformance of a plug in high-permeability zones, for water shutoff, the prevention or plugging of water inflows. The injections are generally done either by an injection well or by a producing well over fairly short durations of several days and always less than one month, and with volumes representing less than 5% of the porous volume of the reservoir. The porous volume corresponds to the volume not occupied by rock in the reservoir that is a permeable zone.

Conversely, enhanced oil recovery (EOR) techniques that implement polymers involve a continuous and prolonged injection of polymer solution in order to flush the reservoir of an injection well up to a producing well. The aim is not to treat a zone of the reservoir, but its entirety, in order to recover as much petroleum (oil) as possible. To that end, it is necessary to inject a much greater volume of aqueous solution generally between 50% and 500%, if not more, of the porous volume. At the producing well(s), an aqueous, oily and sometimes gaseous mixture is recovered that may contain the residues of the injected polymer.

A viscous polymer fluid, according to the technique employed, is injected alone or in conjunction with one or more chemicals useful to enhanced oil recovery.

In all of these techniques, the addition of water-soluble polymers makes it possible to enhance the effectiveness of the flushing by injecting water. The expected and proven benefits of using polymers, through the "viscosification" of injected waters, are improved flushing control of the mobility in the field so as to recover the oil quickly and effectively. These polymers make it possible to enhance the viscosity of the injection water.

It is known to the person skilled in the art that synthetic water-soluble polymers, and particularly polymers containing acrylamide, are very advantageous polymers for increasing the viscosity of aqueous solutions and are in fact primarily used in enhanced hydrocarbon (oil and/or gas) recovery.

The polymers derived from acrylamides used are primarily anionic and can in particular be obtained by the:
 homopolymerization or copolymerization of acrylamide, ATBS, acrylic acid,
 co-hydrolysis or post-hydrolysis of a polyacrylamide,
 copolymerization or terpolymerization of the acrylamide with other functional ionic or non-ionic monomers.

Polyacrylamides are already widely used for enhanced hydrocarbon (oil and/or gas) recovery in the so-called "polymer", "surfactant polymer", "alkaline surfactant polymer" (P, SP, ASP) techniques.

The injected polymer will, during its injection and its propagation in an underground formation, experience various mechanical, chemical and biological degradations. Its concentration will also decrease. Upon leaving the well, the polymer is therefore not identical in quantity or quality relative to the injected polymer and may therefore give the aqueous part of the produced fluid a lower viscosity. Furthermore, the fluid (water+hydrocarbons), during the flushing of the reservoir, or during the passage in the equipment, will become charged with metals and/or $H_2S$.

The production fluid is treated so as to separate the production water and the hydrocarbons (oil and/or gas). The production water contains any such metals and sulfurous compounds, such as $H_2S$. The production water further contains any degraded polymers and residual hydrocarbons, generally less than 10,000 ppm of residual hydrocarbons (oil and/or gas).

The chemical degradation of the polymers is the mechanism that is most difficult to anticipate and quantify due to the fact that it may occur according to multiple mechanisms during the storage of the fluid, during the injection of the fluid, or within the reservoir.

The presence of viscosity in the production water is detrimental to the treatment of the aqueous phase. The treatment is necessary to allow, depending on the configurations, either a discharge into the environment, or a reinjection into a reservoir.

Conversely, the presence of polymer is not bothersome if it does not cause excessive viscosity, generally not more than 2 centipoises. It is therefore not necessary to eliminate the polymer, but it is necessary to limit the viscosity imparted by its presence in said aqueous part.

Various techniques for treating production waters have been proposed. The simplest technique in the context of small-scale "pilot" operations is to mix the produced fluid containing the polymer with other fluids not comprising it. The viscosity of a polymer solution depends inter alia on its concentration. Through a dilution effect of the aqueous phases, the viscosity will therefore be less significant. This solution is only viable for small-scale operations.

In the context of large operations, it is then necessary to treat the fluid to reduce its viscosity. One of the solutions consists of eliminating the polymer by precipitation or filtration.

Precipitation techniques consist of using cationic compounds, which, by interaction with the anionic fillers of the polymer, will cause its auto-coagulation. Examples of cationic compounds commonly used include salts of metals such as aluminum or iron, high-density cationic polymers with fillers and low molecular weights such as polyDADMAC, EPI/DMA, DEC, or mineral particles such as bentonites, kaolins.

Filtration techniques consist of using membranes, such as ultrafiltration.

The elimination of the polymer by precipitation or by filtration is not desirable, since it is generally difficult to separate the polymer selectively from the residual oil. Additionally, the existing techniques require multiple costly steps that do not make it possible to leverage the residual oil.

The most appropriate solution is to degrade the polymer chain to lower its molecular weight. Indeed, the inter-chain interactions of a polymer that create the viscosity are due to the molecular weight of the polymer. A polymer with a lower molecular weight will have fewer inter-chain interactions and, as a result, a lower viscosity. Three main types of degradation have been studied in order to reduce the molecular weight of the polymer.

The least effective is biological degradation, since it requires several hours or several days to be significant. This type of treatment is not in phase with the flow rates and residence times observed in the context of enhanced hydrocarbon (oil and/or gas) recovery.

The second technique is the mechanical degradation of the fluid by shearing. This technique may be done on a grate, slits or orifices, by rapid depressurization, by cavitation, ultrasonically, etc. The polymer is then broken into fragments with lower molecular weights. These treatments are effective but cause a harmful decrease in the diameter of the drops of oil to be purified next. Furthermore, mechanical degradation may prove restrictive, since it requires a high electrical power.

The third studied technique is chemical degradation. This degradation generally involves generating free radicals that will react with the primary chain of the polymer and cause a drop in its molecular weight. This then results in a drop in viscosity of the injection fluid related to a decrease in the hydrodynamic volume.

The free radicals can come from different sources. They can be generated by the cleaving of weak bonds in the polymer chain under the effect of heating/friction or by primer residues or byproduct impurities. Redox systems also generate free radicals.

Application EP 2 450 314 proposes a method for treating production water in which the aim is to break down the residual polymer present in the water from an enhanced oil recovery method, by adding excess oxidizing agent to break down the polymer, then adding a sufficient quantity of reducing agent to neutralize all of the excess oxidizing agent.

Whatever the case may be, the various methods known at this time do not make it possible to obtain a safe and effective treatment that decreases the residual viscosity while allowing the reuse of the production water thus treated without massive use of chemical products.

The Applicant has solved this technical problem by developing a method for treating water derived from the enhanced recovery of hydrocarbons (oil and/or gas) by introducing a specific quantity of oxidizing agent in the presence of $Fe^{2+}$ ions. This method thus makes it possible to obtain an adequate decrease in viscosity for the various steps of the treatment of production water.

DISCLOSURE OF THE INVENTION

The present invention relates to a method for treating production water from the enhanced recovery of hydrocarbons (oil and/or gas).

"Production water" is understood to mean all fresh or salt water, brines, sea water, aquifer water that may come from a hydrocarbon reservoir. Given the presence of potentially degraded polymers, the production water generally has, upon leaving the production well, a viscosity called residual viscosity. Aside from production water, the present invention may also be implemented for any source of polymeric aqueous solution.

Indeed, the enhanced recovery of hydrocarbons (oil and/or gas) implements the injection of an injection fluid into an underground formation.

In general, the injection fluid comprises water (saltwater or non-saltwater, brine, etc.) and one or more water-soluble polymers. It may in particular be a copolymer containing acrylamide, acrylic acid, 2-acrylamido-2-methylpropane sulfonic acid or N-vinyl pyrrolidone.

Thus, the recovered production water comprises one or more water-soluble polymers generating a residual viscosity harmful to the treatment of the water. This would be the polymer or polymers present in the injection fluid.

The Applicant has noted that the combined presence of $Fe^{2+}$ ions, a reaction activator and oxygen, with a specific ratio of introduced $O_2/Fe^{2+}$ ions, makes it possible to solve this problem.

As already indicated, the present invention relates to the treatment of this production water, and in particular the decrease of its viscosity.

More specifically, the present invention relates to a method for treating production water originating from enhanced hydrocarbon recovery, and containing one or more water-soluble polymers and $Fe^{2+}$ ions, consisting of at least partially oxidizing the $Fe^{2+}$ ions by introducing at least one reaction activator and oxygen into said production water. The molar ratio of introduced oxygen to $Fe^{2+}$ ions is less than or equal to 0.25.

As stated, the production water originates from an enhanced hydrocarbon recovery method. The reaction activator makes it possible to activate the oxidation reaction of the $Fe^{2+}$ ions by the oxygen and degradation of the polymer.

The reaction activator can be introduced before and/or during and/or after the introduction of the oxygen. In other words, it can be introduced according to one of the following introduction modes:
- before the introduction of the oxygen; or
- during the introduction of the oxygen; or
- after the introduction of the oxygen; or
- before and during the introduction of the oxygen; or
- before and after the introduction of the oxygen; or
- during and after the introduction of the oxygen; or
- before, during and after the introduction of the oxygen.

In general, the production water originating directly from the treatment of the production fluid (water+hydrocarbons) contains between 0 and 500 ppm of $Fe^{2+}$.

When the quantity of $Fe^{2+}$ initially present in the production water is nil or insufficient, $Fe^{2+}$ ions are added before the introduction of the oxygen and optionally before, during or after the reaction activator. In this case, the $Fe^{2+}$ ions are added according to the means known by one skilled in the art. For example, this may involve introducing ferrous chloride or ferrous sulfate or Mohr's salt compound.

Preferably, the production water treated according to the method according to the invention contains at least 1 ppm (by weight relative to the weight of the production water) of $Fe^{2+}$, advantageously between 1 and 300 ppm of $Fe^{2+}$, and more preferably between 5 and 50 ppm of $Fe^{2+}$. These $Fe^{2+}$ ions may come directly from the production water. The following may also have been introduced before implementing the method according to the invention.

Thus, according to one particular embodiment, the $Fe^{2+}$ ion concentration is at least 1 ppm relative to the weight of the production water, the $Fe^{2+}$ being, if applicable, introduced prior to the introduction of the oxygen and potentially the activator. This embodiment is particularly suitable for the case where the production water naturally contains 0 ppm or less than 1 ppm of $Fe^{2+}$ ions.

According to one particular embodiment, the $Fe^{2+}$ ions are added before, during or after any activator, but before the introduction of the oxygen.

According to the invention, the production water initially contains between 0 and 500 ppb of oxygen, preferentially between 0 and 300 ppb, more preferentially between 0 and 50 ppb of oxygen. Yet this potential quantity of oxygen naturally present in the production water is not sufficient to oxidize the iron II ions so as to cause the decrease in the viscosity of the production water.

This is why the present invention cannot be implemented inherently. It is the conscious addition of a controlled quantity of oxygen that makes it possible to solve the technical problem, which is that of decreasing the viscosity of the production water through controlled oxidation of $Fe^{2+}$ ions so as to break down the polymers present in the production water and responsible for its residual viscosity.

Indeed, controlling the quantity of oxygen introduced into the water makes it possible to limit the residual quantity thereof, and therefore any negative effects. These negative effects may in particular relate to the quality of:
- the residual hydrocarbons that may be separated from the production water; and
- the solution of water-soluble polymers used when the production water is recycled to be injected in an enhanced oil recovery method.

According to the invention, the oxygen is placed in contact with the production water by means known by one skilled in the art. This placement in contact is advantageously done hermetically, such that only the desired quantity of oxygen is introduced.

The introduced quantity of oxygen is defined based on the quantity of $Fe^{2+}$ ions present in the production water, in particular based on the following reaction:

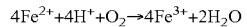

$$4Fe^{2+} + 4H^{+} + O_2 \rightarrow 4Fe^{3+} + 2H_2O$$

Thus, according to one particular embodiment, the method according to the invention may comprise a step for assaying $Fe^{2+}$ ions present in the production water.

The methods for titration of the ferrous iron ($Fe^{2+}$) are based on ASTM D 1068-77, Iron in Water. The principle of this measuring method is to react the ferrous iron with 1,10-phenanthroline to form an orangey complex making it possible to determine the $Fe^{2+}$ ion concentration either comparatively relative to a pre-established concentration range or by spectrophotometric measurement relative to a blank. The titration device and the reagents are available from the companies Hach or Chemetrics.

In a known manner, production water generally contains residual hydrocarbons, the quantity of which is typically less than 10,000 ppm. The production water can therefore be treated in order to extract said residual hydrocarbons (oil and/or gas).

Thus, according to one preferred embodiment, oxygen can be added at the beginning of the method for treating the production water, i.e., after the separation between the hydrocarbons and the production water contained in the production fluid. This introduction of the oxygen at this stage makes it possible to decrease the impact of the viscosity as early as possible in the water purification process.

Thus, according to one particular embodiment of the invention, the production water is treated by separating the production water from residual hydrocarbons, by flotation and/or decanting and/or coalescence and/or centrifugation and/or filtration advantageously done by passage over filtering media (sand, activated carbon, walnut shells, etc.).

According to this specific embodiment, the oxygen may in particular be introduced:
- during the separation step; or
- between the separation and flotation and/or decanting and/or coalescence and/or centrifugation and/or filtration steps; or
- during the flotation and/or decanting and/or coalescence and/or centrifugation and/or filtration step.

According to one particular embodiment of the invention, the introduction of oxygen can be done in a partial derivation of the production water.

Advantageously, between 0.25 and 7 ppm of oxygen is introduced into the production water, relative to the weight of the production water.

Furthermore, and optionally, a compressor can be used in order to increase the oxygen saturation, advantageously in the deviated fraction of the production water.

According to one particular embodiment, the production water is successively treated by:
- separation of the production water and residual hydrocarbons;

flotation of the production water and/or decanting of the production water and/or coalescence of the production water and/or centrifugation of the production water;
filtration of the production water;
and the oxygen is advantageously introduced during the separating step.

According to another particular embodiment, the production water is successively treated by:
separation of the production water and residual hydrocarbons;
flotation of the production water and/or decanting of the production water and/or coalescence of the production water and/or centrifugation of the production water;
filtration of the production water;
and the oxygen is advantageously introduced between the separating and flotation and/or decanting and/or coalescence and/or centrifugation steps.

According to another particular embodiment, the production water is successively treated by:
separation of the production water and residual hydrocarbons;
flotation of the production water and/or decanting of the production water and/or coalescence of the production water and/or centrifugation of the production water;
filtration of the production water;
and the oxygen is advantageously introduced during the flotation and/or decanting and/or coalescence and/or centrifugation steps.

The reaction activator (oxidation of the iron II and degradation of the polymer) may in particular be chosen from the group comprising: stearyl citrate, monoammonium citrate, calcium citrate, calcium disodium ethylenediaminetetraacetate, monocalcium phosphate, tricalcium phosphate, calcium phytate, citric acid, disodium ethylenediaminetetraacetate, glycine, sodium tripolyphosphate, phosphoric acid, monopotassium phosphate, tetrapotassium pyrophosphate, dipotassium phosphate, sodium acid pyrophosphate, sodium citrate, tetrasodium pyrophosphate, monosodium phosphate, disodium phosphate, sodium hexametaphosphate, N,N'-bis(2-hydroxybenzyl)-ethylenediamine-N,N'-diacetic acid, N-(1,2-dicarboxyethyl)-D,L aspartic acid, diethylene triamine pentacetic acid, humic acid, fulvic acid, polyacrylate, polyitaconate, polymaleate, and polyaspartate.

As already stated, the activator can be introduced into the production water before and/or during and/or after the introduction of the oxygen.

The quantity of activator introduced into the production water is advantageously between 1 and 30 ppm, more advantageously between 5 and 20 ppm, relative to the weight of the production water.

Without wishing to put forth any theory, it appears that the activator accelerates the decrease in the residual viscosity of the production water by accelerating the generation of the stream of radicals originating from the reaction between the $Fe^{2+}$ ions and the oxygen $O_2$.

Furthermore and optionally, a deoxygenating agent may be added in order to eliminate the residual oxygen, in the final step, and therefore after the introduction of oxygen and the decrease in the viscosity of the production water.

This embodiment is optional given that the resulting quantity of oxygen generally does not require introducing a reducing agent. The method according to the present invention is therefore preferably implemented without adding a reducing agent able to eliminate any residual oxygen.

Whatever the case may be, this deoxygenating agent may in particular be chosen from the group comprising sulfite, bisulfite, metabisulfite, dithionite, hydrazine and derivatives of hydrazine hydroxylamine Document U.S. Pat. No. 3,343,601 in particular describes the use of this type of agent to deoxygenate a polyacrylamide solution.

This deoxygenating agent acts as a reducing agent modifying the redox potential of the aqueous formulation. It may in particular involve organic sulfites such as alkyl sulfites, alkyl hydrosulfites, sulfinate, sulfoxylate, phosphites, as well as oxalic or formic acid, erythorbate salts, carbohydrazides.

These compounds are generally used to eliminate the traces of oxygen present in the fluid/injection water and typically make it possible to reach dissolved oxygen levels below 200 ppb (parts per billion). Preferably, in agreement with physical, chemical, toxicological and industrial criteria, deoxygenating compounds of the organic and inorganic sulfite type are particularly advantageous. Examples include $Na_2SO_3$ (sodium sulfite) and NaDT (sodium dithionite) or ammonium bisulfite.

At the end of this method for treating production water according to the present invention, the production water advantageously contains less than 500 ppb of oxygen, preferably less than 300 ppb of oxygen, and still more preferably less than 100 ppb of oxygen.

In line and periodic methods for measuring the dissolved oxygen exist. The in-line methods measure the dissolved oxygen according to two principles, electrical and optical. Equipment is available from suppliers such as Presens, Mettler Toledo, Hach, WTW. The periodic measuring methods are colorimetric methods using the oxidation of compounds such as indigo carmine and rhodazine D. Measuring equipment is available from the company Chemetrics.

Furthermore, at the end of this method for treating production water according to the present invention, the production water advantageously contains less than 5 ppm of $Fe^{2+}$, preferably less than 1 ppm of $Fe^{2+}$, and still more preferably less than 0.5 ppm of $Fe^{2+}$.

Additionally, at the end of this method for treating production water according to the present invention, the production water advantageously contains less than 100 ppm of $Fe^{2+}$, preferably less than 10 ppm of $Fe^{2+}$, and still more preferably less than 5 ppm of $Fe^{3+}$.

Without wishing to put forth any theory, the Applicant considers that the oxidation of the $Fe^{2+}$ ions leads to the formation of $Fe^{2+}$ ions and radicals. It appears that the $Fe^{2+}$ break down the polymers much less. The formation of radicals during the oxidation of the $Fe^{2+}$ ions makes it possible to decrease the residual viscosity by breaking down the polymer. The treatment method therefore makes it possible to facilitate the formation of $Fe^{2+}$ while decreasing the residual viscosity of the production water, the phenomenon being accelerated or even amplified by the presence of an activator.

The present invention also relates to an enhanced hydrocarbon (oil and/or gas) recovery method implementing the water originating from the treatment method previously described. This method consists of injecting a polymer solution into an underground formation and recovering the hydrocarbons. The injected polymer solution contains the water originating from the method for treating production water described above.

Thus, at the end of this method for treating production water according to the present invention, when the production water is reinjected into the reservoir, at least one water-soluble polymer is added before the injection into the underground formation.

The polymer is in practice a polymer or advantageously a copolymer containing acrylamide, acrylic acid, 2-acrylamido-2-methylpropane sulfonic acid or N-vinyl pyrrolidone.

The invention and advantages thereof become more apparent from the following non-limiting examples given to describe the invention.

FIGURES

FIG. 1 shows a specific embodiment of the invention implementing a compressor to introduce the oxygen into a deviated fraction of the production water.

EXAMPLE EMBODIMENTS OF THE INVENTION

The decrease in the viscosity of a polymeric aqueous solution was studied over time.

Protocol

A synthetic brine is prepared containing deionized water and the following salts:

NaCl: 3.3 g/L $CaCl_2$, 2 $H_2O$: 0.1 g/L $MgCl_2$, 6 $H_2O$: 0.1 g/L $NaHCO_3$: 1.5 g/L $Na_2SO_4$: 0.2 g/L

Part of the brine is next degassed by bubbling with nitrogen under anoxic atmosphere (less than 50 ppb of oxygen) for one hour.

A polymer solution is prepared in the degassed brine under anoxic atmosphere. The polymer used is an acrylamide/acrylic acid copolymer (70/30 by weight), having a molecular weight of 7 Million g/mol.

During different tests, ferrous chloride, an activator (EDTA—ethylenediaminetetraacetic) and non-degassed brine (oxygen content=7 ppm) are sequentially added to the polymer solution so as to obtain a polymer concentration of 600 ppm.

The solution is kept under agitation and the residual viscosity is measured at 5 minutes and at 30 minutes (Brookfield viscosimeter, UL spindle at 6 rpm at 25° C.; rpm=revolutions per minute). At 30 minutes, the residual oxygen level is measured.

All of the tests are done under anoxic atmosphere (less than 50 ppb of oxygen).

TABLE 1

Quantities of oxygen, $Fe^{2+}$ ions and activator implemented in the counterexamples (CE) and examples according to the invention (INV).

| | CE-1 | CE-2 | CE-3 | CE-4 | CE-5 | CE-6 | INV-1 | INV-2 |
|---|---|---|---|---|---|---|---|---|
| Oxygen (ppm) | 0 | 7 | 1 | 7 | 7 | 7 | 1 | 1 |
| Iron II (ppm) | 0 | 10 | 10 | 0 | 0 | 10 | 10 | 10 |
| Activator (ppm) | 0 | 0 | 0 | 0 | 20 | 15 | 20 | 5 |

TABLE 2

Decrease in viscosity (cps) as a function of time for a solution according to counterexamples CE-1 to CE-6.

| | CE-1 | CE-2 | CE-3 | CE-4 | CE-5 | CE-6 |
|---|---|---|---|---|---|---|
| Initial viscosity | 10 | 10 | 10 | 10 | 10 | 10 |
| Viscosity at 5 minutes | 10 | 7.5 | 10 | 10 | 9.5 | 6 |
| Viscosity at 30 minutes | 10 | 5.5 | 8.5 | 10 | 9.5 | 6 |
| Residual oxygen at 30 minutes (ppm) | 0 | 6 | 0.8 | 7 | 7 | 6 |

TABLE 3

Decrease in viscosity (cps) as a function of time for a solution according to the examples according to the invention INV-1 to INV-2.

| | INV-1 | INV-2 |
|---|---|---|
| Initial viscosity | 10 | 10 |
| Viscosity at 5 minutes | 6 | 7 |
| Viscosity at 30 minutes | 5 | 5.5 |
| Residual oxygen at 30 minutes (ppm) | 0.1 | 0.3 |

An acceptable degradation of the viscosity is obtained at a high oxygen and iron concentration (CE-2 and CE-6) as well as at a high oxygen, iron and activator concentration. In these two cases, the residual oxygen content remains high, which is a drawback in the method used due to the corrosion caused. One major advance is the use of an activator that, combined with iron and a lower oxygen concentration (INV-1 and INV-2), will lead to a decrease in viscosity and a residual oxygen concentration between 100 and 500 ppb. This low oxygen concentration may be reduced by a post-addition of a reducing agent to maintain low oxygen levels.

In the following 3 counterexamples (CE-7 to CE-9), the oxygen is replaced by another oxidizing agent, sodium hypochlorite, as in document EP 2 450 314.

TABLE 4

Quantities (by weight) of sodium hypochlorite, $Fe^{2+}$ ions and activator implemented in counterexamples CE-7 to CE-9.

| | CE-7 | CE-8 | CE-9 |
|---|---|---|---|
| Sodium hypochlorite (ppm) | 1 | 1 | 1 |
| Iron II (ppm) | 0 | 10 | 10 |
| Activator (ppm) | 0 | 0 | 5 |

TABLE 5

Decrease in viscosity (cps) as a function of time for a solution according to counterexamples CE-7 to CE-9.

| | CE-7 | CE-8 | CE-9 |
|---|---|---|---|
| Initial viscosity | 10 | 10 | 10 |
| Viscosity at 5 minutes | 10 | 8 | 8.5 |
| Viscosity at 30 minutes | 9.5 | 7.5 | 8.5 |

Although using an oxidizing agent described in the prior art, the decrease in viscosity is not sufficient at this level.

In the following 3 counterexamples (CE-10 to CE-12), the oxygen is replaced by another oxidizing agent, hydrogen peroxide.

TABLE 6

Quantities (by weight) of hydrogen peroxide, $Fe^{2+}$ ions and activator implemented in counterexamples CE-10 to CE-12.

|  | CE-10 | CE-11 | CE-12 |
|---|---|---|---|
| Hydrogen peroxide (ppm) | 1 | 1 | 1 |
| Iron II (ppm) | 0 | 10 | 10 |
| Activator (ppm) | 0 | 0 | 5 |

TABLE 7

Decrease in viscosity (cps) as a function of time for a solution according to counterexamples CE-10 to CE-12.

|  | CE-10 | CE-11 | CE-12 |
|---|---|---|---|
| Initial viscosity | 10 | 10 | 10 |
| Viscosity at 5 minutes | 10 | 8.5 | 9 |
| Viscosity at 30 minutes | 9 | 8 | 8.5 |

Although using an oxidizing agent, the decrease in viscosity is not sufficient at this level.

In the following 3 counterexamples (CE-13 to CE-15), the oxygen is replaced by another oxidizing agent, potassium permanganate.

TABLE 8

Quantities (by weight) of potassium permanganate, $Fe^{2+}$ ions and activator implemented in counterexamples CE-13 to CE-15.

|  | CE-13 | CE-14 | CE-15 |
|---|---|---|---|
| Potassium permanganate (ppm) | 1 | 1 | 1 |
| Iron II (ppm) | 0 | 10 | 10 |
| Activator (ppm) | 0 | 0 | 5 |

TABLE 9

Decrease in viscosity (cps) as a function of time for a solution according to counterexamples CE-13 to CE-15.

|  | CE-13 | CE-14 | CE-15 |
|---|---|---|---|
| Initial viscosity | 10 | 10 | 10 |
| Viscosity at 5 minutes | 10 | 9 | 9.5 |
| Viscosity at 30 minutes | 9.5 | 8 | 8.5 |

Although using an oxidizing agent, the decrease in viscosity is not sufficient at this level.

Reusing the treated water to dissolve a "new" polymer was studied.

Two solutions containing 1000 ppm of an acrylamide/acrylic acid copolymer (70/30 by weight), having a molecular weight of 18 Million g/mol, are prepared. Each solution is respectively prepared with the treated water of counterexample CE-3 and example INV-1 according to the invention.

The viscosity of the solutions is measured at 20° C. after 3 days of incubation at 55° C.

The viscosity of the solution prepared with the treated water of counterexample CE-3 is 16.5 cps.

The viscosity of the solution prepared with the treated water of example INV-1 according to the invention is 26.5 cps.

The results indeed demonstrate that the method according to the invention makes it possible to obtain a water suitable for polymer dissolution.

The invention claimed is:

1. A method for treating production water originating from enhanced hydrocarbon recovery, and containing one or more water-soluble polymers and $Fe^{2+}$ ions, the method comprising at least partially oxidizing the $Fe^{2+}$ ions by introducing at least one reaction activator and oxygen into said production water, the molar ratio of introduced oxygen to $Fe^{2+}$ ions being less than or equal to 0.25.

2. The method according to claim 1, wherein the activator is introduced into the production water according to one of the following introduction modes:
   before the introduction of the oxygen;
   during the introduction of the oxygen;
   after the introduction of the oxygen;
   before and during the introduction of the oxygen;
   before and after the introduction of the oxygen;
   during and after the introduction of the oxygen;
   before, during and after the introduction of the oxygen.

3. The method according to claim 2, wherein the activator is chosen from the group consisting of: stearyl citrate, monoammonium citrate, calcium citrate, calcium disodium ethylenediaminetetraacetate, monocalcium phosphate, tricalcium phosphate, calcium phytate, citric acid, disodium ethylenediaminetetraacetate, glycine, sodium tripolyphosphate, phosphoric acid, monopotassium phosphate, tetrapotassium pyrophosphate, dipotassium phosphate, sodium acid pyrophosphate, sodium citrate, tetrasodium pyrophosphate, monosodium phosphate, disodium phosphate, sodium hexametaphosphate, N,N'-bis(2-hydroxybenzyl)-ethylenediamine-N,N'-diacetic acid, N-(1,2-dicarboxyethyl)-D,L aspartic acid, diethylene triamine pentacetic acid, humic acid, fulvic acid, polyacrylate, polyitaconate, polymaleate, and polyaspartate.

4. The method according to claim 2, wherein between 1 and 30 ppm of activator is introduced into the production water, relative to the weight of the production water.

5. The method according to claim 2, wherein between 0.25 and 7 ppm of oxygen is introduced into the production water, relative to the weight of the production water.

6. The method according to claim 1, wherein the activator is chosen from the group consisting of: stearyl citrate, monoammonium citrate, calcium citrate, calcium disodium ethylenediaminetetraacetate, monocalcium phosphate, tricalcium phosphate, calcium phytate, citric acid, disodium ethylenediaminetetraacetate, glycine, sodium tripolyphosphate, phosphoric acid, monopotassium phosphate, tetrapotassium pyrophosphate, dipotassium phosphate, sodium acid pyrophosphate, sodium citrate, tetrasodium pyrophosphate, monosodium phosphate, disodium phosphate, sodium hexametaphosphate, N,N'-bis(2-hydroxybenzyl)-ethylenediamine-N,N'-diacetic acid, N-(1,2-dicarboxyethyl)-D,L aspartic acid, diethylene triamine pentacetic acid, humic acid, fulvic acid, polyacrylate, polyitaconate, polymaleate, and polyaspartate.

7. The method according to claim 6, wherein between 1 and 30 ppm of activator is introduced into the production water, relative to the weight of the production water.

8. The method according to claim 6, wherein between 0.25 and 7 ppm of oxygen is introduced into the production water, relative to the weight of the production water.

9. The method according to claim 1, wherein between 1 and 30 ppm of activator is introduced into the production water, relative to the weight of the production water.

10. The method according to claim 9, wherein between 0.25 and 7 ppm of oxygen is introduced into the production water, relative to the weight of the production water.

11. The method according to claim 10, wherein the production water is successively treated by:
- separation of the production water and residual hydrocarbons;
- flotation of the production water and/or decanting of the production water and/or coalescence of the production water and/or centrifugation of the production water;
- filtration of the production water;
- and wherein the oxygen is introduced during the separation step.

12. The method according to claim 10, wherein the production water is successively treated by:
- separation of the production water and residual hydrocarbons;
- flotation of the production water and/or decanting of the production water and/or coalescence of the production water and/or centrifugation of the production water;
- filtration of the production water;
- and wherein the oxygen is introduced between the separation and the flotation and/or decanting and/or coalescence and/or centrifugation steps.

13. The method according to claim 10, wherein the production water is successively treated by:
- separation of the production water and residual hydrocarbons;
- flotation of the production water and/or decanting of the production water and/or coalescence of the production water and/or centrifugation of the production water;
- filtration of the production water;
- and wherein the oxygen is introduced during the flotation and/or decanting and/or coalescence and/or centrifugation step.

14. The method according to claim 10, wherein the concentration in $Fe^{2+}$ ions initially present in the production water is at least 1 ppm relative to the weight of the production water; or if prior to the introduction of the oxygen, the quantity of $Fe^{2+}$ ions is less than 1 ppm, then $Fe^{2+}$ ions are introduced before the introduction of the oxygen.

15. The method according to claim 1, wherein between 0.25 and 7 ppm of oxygen is introduced into the production water, relative to the weight of the production water.

16. The method according to claim 1, wherein the production water is successively treated by:
- separation of the production water and residual hydrocarbons;
- flotation of the production water and/or decanting of the production water and/or coalescence of the production water and/or centrifugation of the production water;
- filtration of the production water;
- and wherein the oxygen is introduced during the separation step.

17. The method according to claim 1, wherein the production water is successively treated by:
- separation of the production water and residual hydrocarbons;
- flotation of the production water and/or decanting of the production water and/or coalescence of the production water and/or centrifugation of the production water;
- filtration of the production water;
- and wherein the oxygen is introduced between the separation and flotation and/or decanting and/or coalescence and/or centrifugation steps.

18. The method according to claim 1, wherein the production water is successively treated by:
- separation of the production water and residual hydrocarbons;
- flotation of the production water and/or decanting of the production water and/or coalescence of the production water and/or centrifugation of the production water;
- filtration of the production water;
- and wherein the oxygen is introduced during the flotation and/or decanting and/or coalescence and/or centrifugation step.

19. The method according to claim 1, wherein the concentration in $Fe'$ ions initially present in the production water is at least 1 ppm relative to the weight of the production water; or if prior to the introduction of the oxygen, the quantity of $Fe^{2+}$ ions is less than 1 ppm, then $Fe^{2+}$ ions are introduced before the introduction of the oxygen.

20. An enhanced hydrocarbon recovery method comprising injecting a polymer solution into an underground formation and recovering the hydrocarbons, wherein the polymer solution contains treated production water containing one or more water-soluble polymers and $Fe^{2+}$ ions, wherein the treated production water is obtained by a method for treating production water originating from enhanced hydrocarbon recovery, and containing one or more water-soluble polymers and $Fe^{2+}$ ions, the treating method comprising at least partially oxidizing the $Fe^{2+}$ ions by introducing at least one reaction activator and oxygen into said production water, the molar ratio of introduced oxygen to $Fe^{2+}$ ions being less than or equal to 0.25.

* * * * *